Patented Dec. 11, 1923.

1,477,047

UNITED STATES PATENT OFFICE.

HARRY ESSEX AND ALGER L. WARD, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF MAKING HALOLEFINES.

No Drawing.        Application filed October 14, 1919. Serial No. 330,651.

*To all whom it may concern:*

Be it known that we, HARRY ESSEX and ALGER L. WARD, citizens of the United States, and residents of Wilmington, in the county of New Castle and State of Delaware, have invented a certain new and useful Process of Making Halolefines, of which the following is a specification.

This invention relates to a catalytic process of making a halolefine, and particularly an allyl halide, by splitting off hydrogen halide from an alkylene halide containing more than two carbon atoms such as a propylene halide. In general the new process comprises bringing a dihalopropane, such as dibrom- or dichlor-propane, in contact with a catalyst, for example calcium chloride, at a high temperature to cause the splitting off therefrom of hydrogen bromide or hydrogen chloride. The chemical reaction involved may be represented by the equation:

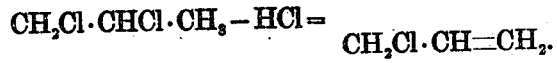

$$CH_2Cl \cdot CHCl \cdot CH_3 - HCl = CH_2Cl \cdot CH=CH_2.$$

It has heretofore been proposed to make allyl chloride from dichlorpropane by allowing it to drop on a heated alkali metal or other metal or on a suitable heated alkaline compound, as for example, metallic magnesium, calcium or aluminum, or potassium hydroxide, sodium hydroxide, calcium hydroxide, or magnesium hydroxide.

In the course of our experimental work we have found, however, that the desired decomposition may be more advantageously effected by passing the vapors of propylene chloride over a hot metal chloride such as calcium or barium chloride. The reaction in this case is catalytic, the calcium or barium chloride remaining unchanged in the reaction tube. The hydrogen chloride may be removed from the reaction products simply by washing with water.

The temperature of the metal chloride used as a catalyst should ordinarily be maintained between 200 and 400° C., and preferably from 300 to 350° C.

The new process may be illustrated by the following example:—

Propylene chloride (that is, 1.2-dichlorpropane) is vaporized and passed through a tube containing anhydrous calcium chloride, the temperature of the tube being maintained at about 350° C.

The vapors issuing from the tube, and containing some unchanged propylene chloride, are subjected to fractional condensation by passing them through a condenser kept at about 50° C. to separate said propylene chloride. The liquid propylene chloride thus separated is again vaporized and the vapors passed over the catalyst as before. The allyl chloride vapors from which propylene chloride has been removed are then condensed and treated as may be necessary to remove hydrogen chloride and other impurities that may be present.

The data and results of the best runs with each of the several different reagents which have heretofore been proposed and with catalysts which we have discovered to be useful, are tabulated below:—

| Contact material. | Temp. °C. | Prop. chloride consumed. | Allyl chloride formed. | Yield % of theoret. |
|---|---|---|---|---|
| Caustic soda | 250 | 94.2 g. | 8.5 g. | 13.3 |
| Calcium hydroxide | 325 | 145.7 g. | 25.1 g. | 25.5 |
| Barium chloride | 350 | 52.4 g. | 8.5 g. | 24.0 |
| Calcium chloride | 350 | 71.0 g. | 31.7 g. | 65.9 |

The temperatures given in the table were taken in the space between the tube containing the catalyst and the electrical heating element surrounding said tube and are consequently a little higher than the actual reaction temperatures.

Of the important advantages of our process there may be mentioned (1) that a much higher yield is obtained than has been obtained heretofore, (2) that the reaction is catalytic, and (3) that at the same temperature the rate of decomposition of propylene chloride is several times as great with calcium chloride as with calcium hydroxide, the latter being the most feasible, from the commercial standpoint, of the reagents heretofore suggested.

We claim:—

1. The process of making allyl chloride which comprises bringing dichlor-propane into contact with calcium chloride maintained at a temperature of from about 300 to 350° C.

2. The process of making allyl chloride which comprises passing vapors of propylene chloride over calcium chloride maintained at a temperature between 200 and 400° C.

3. The process of making allyl chloride which comprises passing vapors of propylene chloride over calcium chloride maintained at a temperature of from about 300 to 350° C.

4. The process of making a halolefine having a halogen-attached carbon atom adjacent a pair of doubly bound carbon atoms, which comprises passing vapors of an alkylene halide containing more than two carbon atoms over calcium chloride maintained at a temperature of from about 300 to 400° C.

5. The process of making a chlorolefine having a chlorine-attached carbon atom adjacent a pair of doubly bound carbon atoms, which comprises passing vapors of an alkylene chloride containing more than two carbon atoms over calcium chloride maintained at a temperature of from about 300 to 400°C.

In testimony whereof we affix our signatures.

HARRY ESSEX.
ALGER L. WARD.